(12) United States Patent
Arredondo et al.

(10) Patent No.: US 7,300,593 B2
(45) Date of Patent: *Nov. 27, 2007

(54) PROCESS FOR PURIFYING A LIPOPHILIC FLUID

(75) Inventors: Victor Manuel Arredondo, West Chester, OH (US); Mark Robert Sivik, Mason, OH (US); Robb Richard Gardner, Cincinnati, OH (US); Jeffrey Scott Dupont, Cincinnati, OH (US); John Christian Haught, West Chester, OH (US); Arseni Valerevich Radomyselski, Loveland, OH (US); Jeffrey John Hopkins, West Chester, OH (US); William Michael Scheper, Guilford, IN (US); Hiroshi Oh, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 481 days.

This patent is subject to a terminal disclaimer.

(21) Appl. No.: 10/876,177

(22) Filed: Jun. 24, 2004

(65) Prior Publication Data

US 2005/0009724 A1 Jan. 13, 2005

Related U.S. Application Data

(60) Provisional application No. 60/547,355, filed on Feb. 24, 2004, provisional application No. 60/483,290, filed on Jun. 27, 2003.

(51) Int. Cl.
*B01D 37/00* (2006.01)
*D06F 95/00* (2006.01)

(52) U.S. Cl. .................. 210/767; 210/689; 210/690; 210/634; 210/916; 210/758; 210/763; 8/142; 134/13; 556/456

(58) Field of Classification Search ............... None
See application file for complete search history.

(56) References Cited

U.S. PATENT DOCUMENTS

| | | |
|---|---|---|
| 3,395,086 A | 7/1968 | Victor et al. |
| 3,441,501 A | 4/1969 | Segall et al. |
| 3,692,467 A | 9/1972 | Durr et al. |
| 3,733,267 A | 5/1973 | Haase et al. |
| 3,776,853 A | 12/1973 | Minter |
| 3,803,033 A | 4/1974 | Sutherland |
| 3,839,176 A | 10/1974 | McCoy et al. |
| 4,102,824 A | 7/1978 | Mizutani et al. |
| 4,108,599 A | 8/1978 | Coll-Palagos et al. |
| 4,309,247 A | 1/1982 | Hou et al. |
| 4,584,092 A | 4/1986 | Kanematu et al. |
| 4,604,205 A | 8/1986 | Ayers et al. |
| 4,639,321 A | 1/1987 | Barrat et al. |
| 4,664,754 A | 5/1987 | Caputi et al. |
| 4,685,930 A | 8/1987 | Kasprzak et al. |
| 4,708,807 A | 11/1987 | Kemerer et al. |
| 4,747,960 A | 5/1988 | Freeman et al. |
| 4,820,308 A | 4/1989 | Madrange et al. |
| 5,057,240 A | 10/1991 | Madore et al. |
| 5,511,264 A * | 4/1996 | Nishioka et al. ............ 8/158 |
| 5,705,562 A | 1/1998 | Hill et al. |
| 5,707,613 A | 1/1998 | Hill et al. |
| 5,865,852 A | 2/1999 | Berndt et al. |
| 5,876,510 A | 3/1999 | Kuemin et al. |
| 5,882,506 A | 3/1999 | Ohsol et al. |
| 5,888,250 A | 3/1999 | Hayday et al. |
| 5,942,007 A | 8/1999 | Berndt et al. |
| 5,977,040 A | 11/1999 | Inada et al. |
| 5,985,810 A | 11/1999 | Inada et al. |
| 6,013,683 A | 1/2000 | Hill et al. |
| 6,042,617 A | 3/2000 | Berndt et al. |
| 6,042,618 A | 3/2000 | Berndt et al. |
| 6,056,789 A | 5/2000 | Berndt et al. |
| 6,059,845 A | 5/2000 | Berndt et al. |
| 6,060,546 A | 5/2000 | Powell et al. |
| 6,063,135 A | 5/2000 | Berndt et al. |
| 6,086,635 A | 7/2000 | Berndt et al. |
| 6,136,766 A | 10/2000 | Inada et al. |
| 6,156,074 A | 12/2000 | Hayday et al. |
| 6,177,399 B1 | 1/2001 | Mei et al. |
| 6,258,130 B1 | 7/2001 | Murphy et al. |
| 6,273,919 B1 | 8/2001 | Hayday et al. |
| 6,309,425 B1 | 10/2001 | Murphy et al. |
| 6,310,029 B1 | 10/2001 | Kilgour et al. |
| 6,312,476 B1 | 11/2001 | Perry et al. |
| 6,313,079 B1 | 11/2001 | Murphy et al. |
| 6,368,359 B1 | 4/2002 | Perry et al. |
| 2001/0004062 A1 | 6/2001 | Rutledge et al. |
| 2001/0020308 A1 | 9/2001 | Murphy et al. |
| 2001/0034912 A1 | 11/2001 | Kilgour et al. |
| 2002/0004953 A1 | 1/2002 | Perry et al. |
| 2002/0017493 A1 | 2/2002 | Ehnrsperger et al. |

(Continued)

FOREIGN PATENT DOCUMENTS

DE 3739711 6/1989

(Continued)

*Primary Examiner*—Krishnan S. Menon
(74) *Attorney, Agent, or Firm*—Kim W. Zerby; Steven W. Miller

(57) ABSTRACT

A process for purifying dry cleaning solvents from a mixture containing used dry cleaning solvents and contaminants, such as laundry soils, fabric treating agents.

9 Claims, No Drawings

U.S. PATENT DOCUMENTS

| | | |
|---|---|---|
| 2002/0038480 A1 | 4/2002 | Deak et al. |
| 2002/0115582 A1 | 8/2002 | Perry et al. |
| 2002/0174493 A1 | 11/2002 | Perry et al. |
| 2002/0184715 A1 | 12/2002 | Taylor et al. |
| 2004/0142838 A1 | 7/2004 | Azuma et al. |

FOREIGN PATENT DOCUMENTS

| | | |
|---|---|---|
| DE | 29921805 U1 | 12/1999 |
| EP | 0 375 028 A2 | 6/1990 |
| EP | 0644 255 A2 | 3/1995 |
| EP | 0 669 152 A1 | 8/1995 |
| EP | 0841 362 B1 | 5/1998 |
| EP | 0 982 023 A2 | 3/2000 |
| EP | 1 041 189 A1 | 10/2000 |
| EP | 1 043 443 A1 | 10/2000 |
| EP | 1 092 803 A1 | 4/2001 |
| GB | 176540 | 3/1922 |
| GB | 292433 | 6/1928 |
| GB | 350904 | 6/1931 |
| GB | 361690 | 11/1931 |
| GB | 807200 | 1/1959 |
| JP | 60 079297 A | 5/1985 |
| JP | 61-085995 | 5/1986 |
| JP | 2000-290689 | 10/2000 |
| WO | WO 00/04221 A1 | 1/2000 |
| WO | WO 00/04222 A1 | 1/2000 |
| WO | WO 00/63340 A1 | 10/2000 |
| WO | WO 01/06051 A1 | 1/2001 |
| WO | WO 01/27380 A1 | 4/2001 |
| WO | WO 01/34613 A1 | 5/2001 |
| WO | WO 01/40567 A1 | 6/2001 |
| WO | WO 01/44256 A1 | 6/2001 |
| WO | WO 01/93977 A2 | 12/2001 |
| WO | WO 01/94678 A1 | 12/2001 |
| WO | WO 01/94679 A2 | 12/2001 |
| WO | WO 01/94681 A1 | 12/2001 |
| WO | WO 01/94684 A1 | 12/2001 |
| WO | WO 02/46517 A1 | 6/2002 |
| WO | WO 02/48447 A1 | 6/2002 |
| WO | WO 02/50366 A1 | 6/2002 |
| WO | WO 02/77356 A1 | 10/2002 |

* cited by examiner

PROCESS FOR PURIFYING A LIPOPHILIC FLUID

CROSS REFERENCE TO RELATED APPLICATIONS

This application claims the benefit of U.S. Provisional Application Ser. No. 60/547,355 filed on Feb. 24, 2004; and U.S. Provisional Application Ser. No. 60/483,290 filed on Jun. 27, 2003.

FIELD OF THE INVENTION

The present invention relates to a process for purifying dry cleaning solvents from a mixture containing used dry cleaning solvents and contaminants, such as laundry soils, fabric treating agents.

BACKGROUND OF THE INVENTION

Cleaning applications typically involve the removal of foreign matter off surfaces. In laundry applications, this involves the removal of both hydrophobic and hydrophilic soils (food stains, blood, grass, dirt, grease, oils, etc.) off various fabrics including cotton, polyester, silk, rayon, wool and various blends of these materials.

For laundry applications, the consumer has two choices for removal of soils: conventional water based cleaning and dry cleaning (i.e., non-aqueous based cleaning). Compositions suitable for use in conventional water based fabric cleaning systems have been optimized over the years. Specifically, laundry detergents that include surfactants, enzymes, builders, bleaches, chelants, polymers and other additives have been shown to remove both hydrophilic and hydrophobic soils efficiently in a water based fabric cleaning system. More specifically, while cotton, polyester and various blends can be efficiently cleaned using conventional water based systems, other more delicate fabrics, such as silk, wool, and rayon, are prone to fabric damages or shrinkages caused by the water based cleaning process and generally rely on the dry cleaning process.

The dry cleaning process refers to a process where low or no water is used in the cleaning system; it uses various non-aqueous organic solvents, such as halocarbons, hydrocarbons, densified carbon dioxide, glycol ethers and silicones.

Conventional detergent compositions and additives are designed for water based cleaning. It has been found that those conventional detergent compositions and additives are not effective fabric cleaning agents in dry cleaning solvents due to low compatibility with these solvents.

Some additives, such as detersive surfactants, have been developed for dry cleaning applications. An important design feature of these additives is their enhanced compatibility with the dry cleaning solvents. Not limited in theory, it is believed that these detersive surfactants can boost detergency by solubilizing the target soils; by suspending water in the dry cleaning solvents or system, if low levels of water are utilized; and by forming reverse micelles that help trapping soils for removal from the fabric treating system. Surfactant detergency has been discussed in "Detergency of Specialty Surfactants", by F. E. Friedli, Marcel Dekker, Inc., NY (1988). Use of surfactants in a dry cleaning application has been disclosed in U.S. Pat. No. 5,944,996; U.S. Pat. No. 6,548,466; U.S. Pat. No. 6,461,387; U.S. Pat. No. 6,148,644; and U.S. Pat. No. 6,114,295.

Accordingly, there is a continuing need to develop fabric treating agents to enhance soil removal and other fabric treating benefits in non-aqueous cleaning applications.

It is well known that after being used in a laundering treatment, the dry cleaning solvents typically contain fabric treating agents, such as surfactants, soil release polymers, bleaches, enzymes, and other adjunct ingredients. Since the dry cleaning solvents are more expensive than water, there is a need to recycle/reuse the dry cleaning solvents in more than one treatment. Conventional purification process uses distillation to remove the fabric treating agents from the dry cleaning solvents. However, equipment and conditions to run a distillation method are extremely burdensome, energy consuming, and not practical for use in a consumer's home. Accordingly, there is a need to remove fabric treating agents from dry cleaning solvents without distillation. Representative systems using the distillation method are disclosed in EP 543,665 and U.S. Pat. Nos. 5,942,007; 6,056,789; 6,059,845; and 6,086,635.

A typical non-distillative purification method employs filter containing clay and/or activated carbons. Representative filters containing carbon and clay adsorbent materials are disclosed in U.S. Pat. Nos. 4,277,336 and 3,658,459, and some are commercially available KleenRite® filter. However, such filter has a rather limited lifetime before it has to be replaced and are less efficient in removing fabric treating agents.

Therefore, there is a need for a method that effectively removes fabric treating agents, especially surfactants from a dry cleaning solvent so that the purified solvent can be recycled/reused.

There is also a need to have a method capable of purifying a dry cleaning solvent in a safe, economical and energy efficient manner. Therefore, there is a need for a non-distillation method that removes fabric treating agents from the dry cleaning solvent at low temperature and ambient pressure.

Based on the foregoing, it is desirable to have a method that chemically modifies or converts the contaminants into less soluble compounds/molecules, which can be easily removed from the dry cleaning solvent. It is also desirable to have a method that changes the characteristics of the mixture thereby rendering the contaminants less soluble in the mixture such that the contaminants can be easily separated from the mixture. It is further desirable to have a purification process comprising both methods to further enhance the separation of the contaminants from the lipophilic solvent.

SUMMARY OF THE INVENTION

The present invention relates to a process for purifying a lipophilic fluid, the process comprising the steps of:
  (a) obtaining a mixture comprising a lipophilic fluid and one or more contaminants;
  (b) chemically modifying the contaminant;
  (c) contacting the mixture with a purification agent, thereby changing the solubility of the contaminant in the mixture; and
  (d) separating the contaminant from the lipophilic fluid.

DETAILED DESCRIPTION OF THE INVENTION

Definitions

The term "fabric article" used herein is intended to mean any article that is customarily cleaned in a conventional laundry process or in a dry cleaning process. As such the term encompasses articles of clothing, linen, drapery, and clothing accessories. The term also encompasses other items made in whole or in part of fabric, such as carpets, tote bags, furniture covers, tarpaulins, car interior, and the like.

The term "absorbent material" or "absorbent polymer" as used herein means any material capable of selectively ingesting (i.e., absorbing or adsorbing) water and/or water-containing liquids without ingesting dry cleaning solvents. In other words, absorbent materials or absorbent polymers comprise a water absorbing agent, which is referred to in the art as "gel", "polymeric gel" and "super absorbent polymers".

The terms "fabric treatment composition" or "fabric treating composition" as used herein mean a dry cleaning solvent-containing composition that comes into direct contact with fabric articles to be cleaned. It is understood that the composition may also provide uses other than cleaning, such as conditioning, sizing, and other fabric care treatments. Thus, it may be used interchangeably with the term "fabric care composition". Furthermore, optional cleaning adjuncts (such as additional detersive surfactants, bleaches, perfumes, and the like) and other fabric care agents may be added to the composition. It is understood that the term "fabric treating agent/additive" or "fabric care agent/additive" encompasses the cleaning adjuncts and the finishing or fabric care additives.

The term "dry cleaning" or "non-aqueous cleaning" as used herein means a non-aqueous fluid is used as the dry cleaning solvent to clean a fabric article. However, water can be added to the "dry cleaning" method as an adjunct cleaning agent. The amount of water can comprise up to about 25% by weight of the dry cleaning solvent or the fabric treating composition in a "dry cleaning" process. The non-aqueous fluid is referred to as the "lipophilic fluid" or "dry cleaning solvent".

The terms "soil" or 'laundry soil" as used herein mean any undesirable extraneous substance on a fabric article that is the target for removal by a cleaning process. By the terms "water-based" or "hydrophilic" soils, it is meant that the soil comprised water at the time it first came in contact with the fabric article, or the soil retains a certain amount of water on the fabric article. Examples of water-based soils include, but are not limited to beverages, many food soils, water soluble dyes, bodily fluids such as sweat, urine or blood, outdoor soils such as grass stains and mud. On the other hand, the term "lipophilic" soils, as used herein means the soil has high solubility in or affinity for the lipophilic fluid. Examples of lipophilic soils include, but are not limited to body soils, such as mono-, di-, and tri-glycerides, saturated and unsaturated fatty acids, non-polar hydrocarbons, waxes and wax esters, lipids; and laundry materials such as nonionic surfactants; and mixtures thereof.

As used herein, the term "insoluble" means that a material will physically separate (i.e. settle-out, flocculate, float) from the liquid medium (a dry cleaning solvent or water) within 24 hours after being added to the liquid medium, whereas the term "soluble" means that a material does not physically separate from the liquid medium within 24 hours after addition.

Lipophilic Fluid

"Lipophilic fluid" as used herein means any liquid or mixture of liquid that is immiscible with water at up to 20% by weight of water. In general, a suitable lipophilic fluid can be fully liquid at ambient temperature and pressure, can be an easily melted solid, e.g., one that becomes liquid at temperatures in the range from about 0° C. to about 60° C., or can comprise a mixture of liquid and vapor phases at ambient temperatures and pressures, e.g., at 25° C. and 1 atm. pressure.

The suitable lipophilic fluid may be non-flammable or, have relatively high flash points and/or low VOC characteristics, these terms having conventional meanings as used in the dry cleaning industry, to equal or exceed the characteristics of known conventional dry cleaning fluids. As used herein, the "dry cleaning solvents" useful in the present invention refers to the lipophilic fluids.

Non-limiting examples of suitable lipophilic fluid materials include siloxanes, other silicones, hydrocarbons, glycol ethers, glycerine derivatives such as glycerine ethers, perfluorinated amines, perfluorinated and hydrofluoroether solvents, low-volatility nonfluorinated organic solvents, diol solvents, other environmentally-friendly solvents and mixtures thereof.

"Siloxane" as used herein means silicone fluids that are non-polar and insoluble in water or lower alcohols. Linear siloxanes (see for example U.S. Pat. Nos. 5,443,747, and 5,977,040) and cyclic siloxanes are useful herein, including the cyclic siloxanes selected from the group consisting of octamethyl-cyclotetrasiloxane (tetramer), dodecamethyl-cyclohexasiloxane (hexamer), decamethyl-cyclopentasiloxane (pentamer, commonly referred to as "D5"), and mixtures thereof. A suitable siloxane comprises more than about 50% cyclic siloxane pentamer, or more than about 75% cyclic siloxane pentamer, or at least about 90% of the cyclic siloxane pentamer. Also suitable for use herein are siloxanes that are a mixture of cyclic siloxanes having at least about 90% (or at least about 95%) pentamer and less than about 10% (or less than about 5%) tetramer and/or hexamer.

The lipophilic fluid can include any fraction of dry-cleaning solvents, especially newer types including fluorinated solvents, or perfluorinated amines. Some perfluorinated amines such as perfluorotributylamines, while unsuitable for use as lipophilic fluid, may be present as one of many possible adjuncts present in the lipophilic fluid-containing composition.

Other suitable lipophilic fluids include, but are not limited to, diol solvent systems e.g., higher diols such as $C_6$ or $C_8$ or higher diols, organosilicone solvents including both cyclic and acyclic types, and the like, and mixtures thereof.

Non-limiting examples of low volatility non-fluorinated organic solvents include for example OLEAN® and other polyol esters, or certain relatively nonvolatile biodegradable mid-chain branched petroleum fractions.

Non-limiting examples of glycol ethers include propylene glycol methyl ether, propylene glycol n-propyl ether, propylene glycol t-butyl ether, propylene glycol n-butyl ether, dipropylene glycol methyl ether, dipropylene glycol n-propyl ether, dipropylene glycol t-butyl ether, dipropylene glycol n-butyl ether, tripropylene glycol methyl ether, tripropylene glycol n-propyl ether, tripropylene glycol t-butyl ether, tripropylene glycol n-butyl ether.

Non-limiting examples of other silicone solvents, in addition to the siloxanes, are well known in the literature, see, for example, Kirk Othmer's Encyclopedia of Chemical Technology, and are available from a number of commercial sources, including GE Silicones, Toshiba Silicone, Bayer, and Dow Corning. For example, one suitable silicone solvent is SF-1528 available from GE Silicones.

Non-limiting examples of suitable glycerine derivative solvents include materials having the following structure:

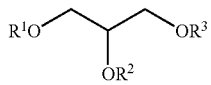

wherein $R^1$, $R^2$ and $R^3$ are each independently selected from: H; branched or linear, substituted or unsubstituted $C_1$-$C_{30}$ alkyl, $C_2$-$C_{30}$ alkenyl, $C_1$-$C_{30}$ alkoxycarbonyl, $C_3$-$C_{30}$ alkyleneoxyalkyl, $C_1$-$C_{30}$ acyloxy, $C_7$-$C_{30}$ alkylenearyl; $C_4$-$C_{30}$ cycloalkyl; $C_6$-$C_{30}$ aryl; and mixtures thereof. Two or more of $R^1$, $R^2$ and $R^3$ together can form a $C_3$-$C_8$ aromatic or non-aromatic, heterocyclic or non-heterocyclic ring.

Non-limiting examples of suitable glycerine derivative solvents include 2,3-bis(1,1-dimethylethoxy)-1-propanol; 2,3-dimethoxy-1-propanol; 3-methoxy-2-cyclopentoxy-1-propanol; 3-methoxy-1-cyclopentoxy-2-propanol; carbonic acid (2-hydroxy-1-methoxymethyl)ethyl ester methyl ester; glycerol carbonate and mixtures thereof.

Non-limiting examples of other environmentally-friendly solvents include lipophilic fluids that have an ozone formation potential of from about 0 to about 0.31, lipophilic fluids that have a vapor pressure of from about 0 to about 0.1 mm Hg, and/or lipophilic fluids that have a vapor pressure of greater than 0.1 mm Hg, but have an ozone formation potential of from about 0 to about 0.31. Non-limiting examples of such lipophilic fluids that have not previously been described above include carbonate solvents (i.e., methyl carbonates, ethyl carbonates, ethylene carbonates, propylene carbonates, glycerine carbonates) and/or succinate solvents (i.e., dimethyl succinates).

"Ozone Reactivity" as used herein is a measure of a VOC's ability to form ozone in the atmosphere. It is measured as grams of ozone formed per gram of volatile organics. A methodology to determine ozone reactivity is discussed further in W. P. L. Carter, "Development of Ozone Reactivity Scales of Volatile Organic Compounds", Journal of the Air & Waste Management Association, Vol. 44, Page 881-899, 1994. "Vapor Pressure" as used can be measured by techniques defined in Method 310 of the California Air Resources Board.

In one embodiment, the lipophilic fluid comprises more than 50% by weight of the lipophilic fluid of cyclopentasiloxanes (e.g., D5) and/or linear analogs having approximately similar volatility, and optionally complemented by other silicone solvents.

The level of lipophilic fluid, when present in the treating compositions according to the present invention, is from greater than about 50% to about 99.99%, or from about 60% to about 95%, or from about 70% to about 90% by weight of the treating composition.

Fabric Treatment Compositions

The fabric treatment composition for use in treating/cleaning fabric articles may comprise a lipophilic fluid, a fabric treating agent having one or more functional moieties, and optionally, water, polar solvents, cleaning adjuncts and/or fabric treating agents.

A given fabric treating agent, when present in the composition, typically comprises from about 0.01% to about 80%, or from about 0.5% to about 60%, or from about 1% to about 50% by weight of the composition. The fabric treating agents are not required to be present at the same concentration. For example, an enzyme can be present at a level of about 1/10 to about 1/100 of the level of a detersive surfactant.

When the composition is diluted with the lipophilic fluid to form the wash liquor, a given fabric treating agent, when present, typically comprises from about 0.0001% to about 50%, or from about 0.01% to about 30%, or from about 1% to about 20% by weight of the wash liquor.

In some embodiments, polar solvents may optionally be incorporated into the wash liquor as well. The polar solvent may be added as a component of the fabric treatment composition or as a co-solvent of the lipophilic fluid in the wash liquor. The polar solvent can be water, and optionally also includes linear or branched C1-C6 alcohols, C1-C4 glycols and mixtures thereof.

When present, the polar solvent ranging from about 99% to about 1%, or from about 5% to about 40%, by weight of the composition; and cleaning adjuncts ranging from about 0.01% to about 50%, or from about 5% to about 30%, by weight of the composition.

Contaminants

The contaminants that may enter the dry cleaning solvent during fabric article treating processes typically include laundry soils, especially lipophilic laundry soils, such as nonionic surfactants, saturated and unsaturated fatty acids, mono-, di- and tri-glycerides, non-polar hydrocarbons, waxes and wax esters, lipids, and mixtures thereof.

The contaminants may also come from the fabric treating agents in the composition, including, but are not limited to: soil release polymers, detersive surfactants, bleaches, enzymes, perfumes, softening agents, finishing polymers, dyes, dye transfer inhibiting agents, dye fixatives, fiber rebuild agents, wrinkle reducing and/or removing agents, fiber repair agents, perfume release and/or delivery agents, shape retention agents, fabric and/or soil targeting agents, antibacterial agents, anti-discoloring agents, hydrophobic finishing agents, UV blockers, brighteners, pigments (e.g., $Al_2O_3$, $TiO_2$), pill prevention agents, temperature control agent, skin care lotions (comprising humectants, moisturizers, viscosity modifiers, fragrances, etc.), insect repellents, fire retardants, and mixtures thereof. Some of these fabric treating agents are described in detail below.

Soil Release Polymers

The term "soil-release" as used herein refers to the ability of the fabric article to be washed or otherwise treated to remove soils that have come into contact with the fabric article. The present invention does not wholly prevent the attachment of soil to the fabric article, but hinders such attachment and improves the cleanability of the fabric article. Nonlimiting examples of soil release polymers suitable for use herein include fluorine-containing soil release polymers and silicone-containing soil release polymers.

Examples of fluorine-containing soil release polymers (fluoro-SRPs) useful in the present invention can be a polymer derived from perfluoroalkyl monomers, or from a mixture of perfluoroalkyl monomers and alkyl methacrylate monomers. The perfluoroalkyl monomer has the formula (a):

$$R_f\text{-Q-A-C(O)}-\text{C(R)}=\text{CH}_2 \quad\quad (a)$$

wherein $R_f$ of formula (a) is a linear or branched perfluoroalkyl group containing from 2 to about 20 carbon atoms; R of formula (a) is H or $CH_3$; A is O, S, or N(R'); Q of formula (a) is alkylene of 1 to about 15 carbon atoms, hydroxyalkylene of 3 to about 15 carbon atoms, —$(C_nH_{2n})(OC_qH_{2q})_m$—, —$SO_2$—$NR'(C_nH_{2n})$—, or —$CONR'(C_nH_{2n})$—; wherein R' is H or alkyl of 1 to about 4 carbon atoms; n is 1 to about 15; q is 2 to about 4; and m is 1 to about 15.

In one embodiment, the fluoroalkyl monomer is a perfluoroalkylethyl (meth)acrylate. In another embodiment, the perfluoroalkyl carbon chain length distribution by weight is about 50% of C8, about 29% of CIO, about 11% of C12, and the balance of C6, 14-carbon and longer chain lengths. This composition is available as ZONYL TA-N® from E. I. du Pont de Nemours and Company of Wilmington, Del. The proportion of fluoroalkyl monomer is at least about 70% relative to the total weight of copolymer.

The alkyl methacrylate monomer has the formula (b):

R"—O—C(O)—C(R)=CH$_2$  (b)

wherein R" of formula (b) is independently selected from H, linear or branched alkyl groups of about 1 to about 24 carbons, linear or branched alkyl groups of about 1 to about 24 carbons modified to contain I to 3 nitrogens, and mixtures thereof; and R of formula (b) is H or CH$_3$. The alkyl (meth)acrylate is added so as to constitute 5-25% of the monomer chain units on a weight basis. In one embodiment, the alkyl methacrylate is stearyl methacrylate.

Exemplary fluoro-SRPs are available under the tradename REPEARL F35® in an aqueous suspension form from Mitsubishi, and under the tradenames ZONYL 7060®, ZONYL 8300®, and ZONYL 8787® from DuPont. Other suitable fluoro-SRPs are disclosed in WO 01/98384, WO 01/81285; JP 10-182814; JP 2000-273067; WO 98/4160213, and WO 99/69126.

Exemplary silicone-containing soil release polymers (Si-SRPs) can have the following formula (c):

$M_aD_bD'_cT_d(D_eM_a)_{+d}$  (c)

wherein a of formula (c) is 0-2; b of formula (c) is 0-1000; c of formula (c) is 0-200; d of formula (c) is 0-1; e of formula (c) is 0-1000, provided that a+c+d+e of formula (c) is at least 1;

M of formula (c) is $R^1{}_{3-f}X_fSiO_{1/2}$ wherein R' of formula (c) is independently H, or a monovalent hydrocarbon group, X of formula (c) is hydroxyl, alkoxy group, and f is 0 or 1;

D of formula (c) is $R^4{}_2SiO_{1/2}$ wherein $R^4$ of formula (c) is independently H or a monovalent hydrocarbon group;

D' of formula (c) is $R^5{}_2SiO_{2/2}$ wherein $R^5$ of formula (c) is independently H, a monovalent hydrocarbon group or $(CH_2)_g(C_6Q_4)_h(A)_i$-$[(L)_j$-$(A')_k$-$]_l$, wherein g of formula (c) is 1-10; h of formula (c) is 0 or 1; i of formula (c) is 0-5; j of formula (c) is 0-3; k of formula (c) is 0 or 1; l of formula (c) is 0-10; $C_6Q_4$ of formula (c) is unsubstituted or substituted with Q of formula (c) is independently H, $C_{1-10}$ alkyl, $C_{1-10}$ alkenyl, and mixtures thereof; A and A' of formula (c) are each independently a linking moiety representing an ether, an amido, an amino, a $C_{1-4}$ fluoroalkyl, a $C_{1-4}$ fluoroalkenyl, an ammonium, and mixtures thereof; L of formula (c) is a $C_{1-30}$ straight chained or branched alkyl or alkenyl or an aryl which is unsubstituted or substituted;

T of formula (c) is $R^6{}_1SiO_{3/2}$ wherein $R_6$ of formula (c) is $(CH_2)_m(C_6Q_4)_n(A)_o$-$[(L)_p$-$(A')_q$-$]_r$, wherein m of formula (c) is 1-10; n of formula (c) is 0 or 1; o of formula (c) is 0-5; p of formula (c) is 0-3; q of formula (c) is 0 or 1; r of formula (c) is 0-10; $C_6Q_4$ of formula (c) is unsubstituted or substituted with Q of formula (c) is independently H, $C_{1-10}$ alkyl, $C_{1-10}$ alkenyl, and mixtures thereof; A and A' of formula (c) are each independently a linking moiety representing an ether, an amido, an amino, a $C_{1-4}$ fluoroalkyl, a $C_{1-4}$ fluoroalkenyl, an ammonium, and mixtures thereof; L of formula (c) is a $C_{1-30}$ straight chained or branched alkyl or alkenyl or an aryl which is unsubstituted or substituted.

Exemplary Si-SRPs are commercially available as DF104, DF1040, SM2125, SM2245, SM2101, SM2059 from GE, and Dow Corning 75SF® Emulsion.

Also suitable for use as soil release polymer in the present invention are water soluble modified celluloses which include, but are not limited to: carboxymethylcellulose, hydroxypropylcellulose, methylcellulose, and like compounds. These compounds, and other suitable compounds, are described in Kirk Othmer Encyclopedia of Chemical Technology, $4^{th}$ Edition, vol. 5, pages 541-563, under the heading of "Cellulose Ethers", and in the references cited therein.

Another class of suitable soil release polymers may comprise block copolymers of polyalkylene terephthalate and polyoxyethylene terephthalate, and block copolymers of polyalkylene terephthalate and polyethylene glycol. These compounds are disclosed in details in are discussed in U.S. Pat. No. 6,358,914 and U.S. Pat. No. 4,976,879.

Another class of soil release polymer is a crystallizable polyester comprising ethylene terephthalate monomers, oxyethylene terephthalate monomers, or mixtures thereof. Examples of this polymer are commercially available as Zelcon 4780® (from DuPont) and Milease T® (from ICI). A more complete disclosure of these soil release agents is contained in EP 0 185 427 A1.

Detersive Surfactants

The surfactant suitable for use in the present invention has the general formula:

$Y_u$-$(L_t$-$X_v)_x$—$Y'_w$  (I)

$L_y$-$(X_v$-$Y_u)_x$—$L'_z$  (II)

and mixtures thereof;

wherein L and L' are solvent compatibilizing (or lipophilic) moieties, which are independently selected from:
  (a) C1-C22 alkyl or C4-C12 alkoxy, linear or branched, cyclic or acyclic, saturated or unsaturated, substituted or unsubstituted;
  (b) siloxanes having the formula:

$M_aD_bD'_cD''_d$ wherein a is 0-2; b is 0-1000; c is 0-50; d is 0-50, provided that a+c+d is at least 1;

M of formula (III) is $R^1{}_{3-e}X_eSiO_{1/2}$ wherein $R^1$ of formula (III) is independently H, or a monovalent hydrocarbon group, X of formula (III) is hydroxyl group, and e is 0 or 1;

D of formula (III) is $R^4{}_2SiO_{2/2}$ wherein $R^4$ of formula (III) is independently H or a monovalent hydrocarbon group;

D' of formula (III) is $R^5{}_2SiO_{2/2}$ wherein $R^5$ of formula (II) is independently $R^2$ of formula (III) provided that at least one $R^5$ of formula (III) is $(CH_2)_f(C_6Q_4)_gO$—$(C_2H_4O)_h$-$(C_3H_6O)_i(C_kH_{2k})_j$-$R^3$, wherein $R^3$ of formula (III) is independently H, a monovalent hydrocarbon group or an alkoxy group, f of formula (III) is 1-10, g of formula (III) is 0 or 1, h of formula (III) is 1-50, i of formula (III) is 0-50, j of formula (III) is 0-50, k of formula (III) is 4-8; $C_6Q_4$ of formula (III) is unsubstituted or substituted with Q of formula (III) is independently H, $C_{1-10}$ alkyl, $C_{1-10}$ alkenyl, and mixtures thereof;

D" of formula (III) is $R^6{}_2SiO_{2/2}$ wherein $R^6$ of formula (III) is independently H, a monovalent hydrocarbon group or $(CH_2)_l(C_6Q_4)_m(A)_n$-$[(L)_o$-$(A')_p$-$]_q$-$(L')_r Z(G)_s$, wherein l of formula (III) is 1-10; m of formula (III) is 0 or 1; n of formula (III) is 0-5; o of formula (III) is 0-3; p of formula (III) is 0 or 1; q of formula (III) is 0-10; r of formula (III) is 0-3; s of formula (III) is 0-3; $C_6Q_4$ of formula (III) is unsubstituted or substituted with Q of formula (III) is independently H, $C_{1-10}$ alkyl, $C_{1-10}$ alkenyl, and mixtures thereof; A and A' of formula (III) are each independently a linking moiety representing an ester, a keto, an ether, a thio, an amido, an amino, a $C_{1-4}$ fluoroalkyl, a $C_{1-4}$ fluoroalkenyl, a branched or straight chained polyalkylene oxide, a phosphate, a sulfonyl, a sulfate, an ammonium, and mixtures thereof; L and L' of formula (III) are each independently a $C_{1-30}$ straight chained or branched alkyl or alkenyl or an aryl which is unsubstituted or substituted; Z of formula (III) is a hydrogen, carboxylic acid, a hydroxy, a phosphate, a phosphate ester, a sulfonyl, a sulfonate, a sulfate, a branched or straight-chained polyalkylene oxide, a nitryl, a glyceryl, an aryl unsubstituted or substituted with a $C_{1-30}$ alkyl or alkenyl, a carbohydrate unsubstituted or substituted with a $C_{1-10}$ alkyl or alkenyl or an ammonium; G of formula (III) is an anion or cation such as $H^+$, $Na^+$, $Li^+$, $K^+$, $NH_4^+$, $Ca^{+2}$, $Mg^{+2}$, $Cl^-$, $Br^-$, $I^-$, mesylate or tosylate;

Y and Y' are hydrophilic moieties, which are independently selected from hydroxy; polyhydroxy; C1-C3 alkoxy; mono- or di- alkanolamine; C1-C4 alkyl substituted alkanolamine; substituted heterocyclic containing O, S, N; sulfates; carboxylate; carbonate; and when Y and/or Y' is ethoxy (EO) or propoxy (PO), it must be capped with R, which is selected from the group consisting of:

(i) a 4 to 8 membered, substituted or unsubstituted, heterocyclic ring containing from 1 to 3 hetero atoms; and (ii) linear or branched, saturated or unsaturated, substituted or unsubstituted, cyclic or acyclic, aliphatic or aromatic hydrocarbon radicals having from about 1 to about 30 carbon atoms;

X is a bridging linkage selected from O; S; N; P; C1 to C22 alkyl, linear or branched, saturated or unsaturated, substituted or unsubstituted, cyclic or acyclic, aliphatic or aromatic, interrupted by O, S, N, P; glycidyl, ester, amido, amino, PO42-, HPO4-, PO32-, HPO3-, which are protonated or unprotonated;

u and w are integers independently selected from 0 to 20, provided that u+w≧1;

t is an integer from 1 to 10;

v is an integer from 0 to 10;

x is an integer from 1 to 20; and y and z are integers independently selected from 1 to 10.

Yet another class of suitable surfactants are organosulfosuccinates, with carbon chains of from about 6 to about 20 carbon atoms. In one embodiment, the organosulfosuccinates contain dialkly chains, each with carbon chains of from about 6 to about 20 carbon atoms. In another embodiment, the organosulfosuccinates have chains containing aryl or alkyl aryl, substituted or unsubstituted, branched or linear, saturated or unsaturated groups. Nonlimiting commercially available examples of suitable organosulfosuccinate surfactants are available under the trade names of Aerosol OT® and Aerosol TR-70® (ex. Cytec).

Bleaches

Nonlimiting examples of suitable bleaches are selected from the group consisting of catalytic metal complexes, activated peroxygen sources, bleach activators, bleach boosters, photobleaches, free radical initiators and hyohalite bleaches.

Examples of suitable catalytic metal complexes include, but are not limited to, manganese-based catalysts such as $Mn^{IV}_2$ (u-O)$_3$(1,4,7-trimethyl-1,4,7-triazacyclononane)$_2$ (PF$_6$)$_2$ disclosed in U.S. Pat. No. 5,576,282, cobalt based catalysts disclosed in U.S. Pat. No. 5,597,936 such as cobalt pentaamine acetate salts having the formula [Co(NH$_3$)$_5$ OAc] T$_y$, wherein "OAc" represents an acetate moiety and "T$_y$" is an anion; transition metal complexes of a macropolycyclic rigid ligand—abreviated as "MRL". Suitable metals in the MRLs include Mn, Fe, Co, Ni, Cu, Cr, V, Mo, W, Pd, and Ru in their various oxidation states. Examples of suitable MRLs include: Dichloro-5,12-diethyl-1,5,8,12-tetraazabicyclo[6.6.2]hexadecane Manganese(II), Dichloro-5, 12-diethyl-1,5,8,12-tetraazabicyclo[6.6.2]hexadecane Manganese(III) Hexafluorophosphate and Dichloro-5-n-butyl-12-methyl-1,5,8,12-tetraazabicyclo[6.6.2]hexadecane Manganese(III). Suitable transition metal MRLs are readily prepared by known procedures, such as taught for example in WO 00/332601, and U.S. Pat. No. 6,225,464.

Suitable activated peroxygen sources include, but are not limited to, preformed peracids, a hydrogen peroxide source in combination with a bleach activator, or a mixture thereof. Suitable preformed peracids include, but are not limited to, compounds selected from the group consisting of percarboxylic acids and salts, percarbonic acids and salts, perimidic acids and salts, peroxymonosulfuric acids and salts, and mixtures thereof. Suitable sources of hydrogen peroxide include, but are not limited to, compounds selected from the group consisting of perborate compounds, percarbonate compounds, perphosphate compounds and mixtures thereof. Suitable types and levels of activated peroxygen sources are found in U.S. Pat. Nos. 5,576,282, 6,306,812 B1 and 6,326, 348 B1 that are incorporated by reference.

Suitable bleach activators include, but are not limited to, perhydrolyzable esters and perhydrolyzable imides such as, tetraacetyl ethylene diamine, octanoylcaprolactam, benzoyloxybenzenesulphonate, nonanoyloxybenzenesulphonate, benzoylvalerolactam, dodecanoyloxybenzenesulphonate.

Suitable bleach boosters include, but are not limited to, those described U.S. Pat. No. 5,817,614.

Enzymes

Nonlimiting examples of suitable enzymes include proteases, amylases, cellulases, lipases, and others. Suitable proteases include subtilisins from *Bacillus* e.g. *subtilis, lentus, licheniformis, amyloliquefaciens* (BPN, BPN'), *alcalophilus*,] under the tradenames of Esperase®, Alcalase®, Everlase® and Savinase® (from Novozymes), BLAP and variants (from Henkel). Other suitable proteases are described in EP130756, WO 91/06637, WO 95/10591 and WO99/20726. Suitable amylases (α and/or β) are described in WO 94/02597 and WO 96/23873. Nonlimiting examples of commercially available amylases include Purafect Ox Am® (from Genencor) and Termamyl®, Natalase®, Ban®, Fungamyl® and Duramyl(® (from Novozymes). Suitable cellulases include bacterial or fungal cellulases, such as those produced by *Humicola insolens*, particularly DSM 1800 [commercially avaialbe as Carezyme®]. Other suitable cellulases are the EGIII cellulases produced by *Trichoderma longibrachiatum*. Suitable lipases include those produced by *Pseudomonas* and *Chromobacter* groups. Nonlimiting examples of commercially available lipases include Lipolase®, Lipolase Ultra®, Lipoprime® and Lipex® from Novozymes. Also suitable for use herein are cutinases [EC 3.1.1.50]; esterases; carbohydrases such as mannanase (U.S. Pat. No. 6,060,299); pectate lyase (WO 99/27083) cyclomaltodextringlucanotransferase (WO 96/33267); and xyloglucanase (WO 99/02663). Additionally, nonlimiting examples of bleaching enzymes include peroxidases, accases, oxygenases, (e.g. catechol 1,2 dioxygenase, lipoxygenase (WO 95/26393), (non-heme) haloperoxidases.

Perfumes and Perfume Delivery Systems

As used herein the term "perfume" refers to any odoriferous material. Suitable perfumes include but are not limited to one or more aromatic chemicals, naturally derived oils and mixtures thereof. Chemical classes for such aromatic chemicals and essential oils include but are not limited to alcohols, aldehydes, esters, ketones. Perfume is commonly provided with a perfume delivery system.

Suitable perfume delivery systems include but are not limited to perfume loaded cyclodextrins, amine assisted delivery compositions, polymer-assisted perfume systems, reactive/pro-perfume systems and inorganic carrier systems. Perfume loaded cyclodextrin delivery compositions comprise perfume materials or blends complexed with cyclodextrin type materials—a majority of the cyclodextrin may be alpha-, beta-, and/or gamma-cyclodextrin, or simply beta-cyclodextrin. Processes for producing cyclodextrins and cyclodextrin delivery compositions are further described in U.S. Pat. Nos. 3,812,011, 4,317,881, 4,418,144 and 5,552,378.

Amine assisted delivery systems comprise one or more perfumes and a polymeric and/or non-polymeric amine material that is added separately from the perfume to the finished products. Such systems are described in WO 03/33635 and WO 03/33636.

Polymer-assisted delivery systems use physical bonding of polymeric materials and perfumes to deliver perfume materials. Suitable polymer assisted systems, include but not limited to, reservoir systems (coacervates, microcapsules, starch encapsulates), and matrix systems (polymer emulsions, latexes). Such systems are further described in WO 01/79303, WO 00/68352, WO 98/28339, and U.S. Pat. Nos. 5,188,753 and 4,746,455.

Reactive/pro perfumes systems include, but are not limited to, polymeric pro-perfumes that comprise perfume materials, typically aldehyde or ketone perfumes, reacted with polymeric carriers, typically nitrogen based carriers, prior to addition to a product; non-polymeric pro-perfume systems that comprise perfume materials reacted with non-polymeric materials for example, Michael adducts ($\beta$-amino ketones), Schiff bases (imines), oxazolidines, $\beta$-Keto Esters, orthoesters and photo pro-perfumes. Such systems are further described in WO 00/24721, WO 02/83620 and U.S. Pat. Nos. 6,013,618 and 6,451,751.

Inorganic carrier systems that comprise inorganic materials (porous zeolites, silicas, etc.) that are loaded with one or more perfume materials. Such systems are further described in U.S. Pat. Nos.: 5,955,419, 6,048,830 and 6,245,732.

Softening Agents

Suitable fabric softening agents or actives include, but are not limited to, diester quaternary ammonium compounds (DEQA); polyquaternary ammonium compounds; triethanolamine esterified with carboxylic acid and quaternized (so called "esterquat"); amino esterquats; cationic diesters; betaine esters; cationic polymers of cyclic polyols and/or reduced saccharides (so called "polyol polyesters" or "Sefose"); silicone or silicone emulsions comprising aminosilicones, cationic silicones, quat/silicone mixtures; functionalized PDMS; and mixtures thereof.

Deposition aids, typically comprise a cationic moiety, can also be used in combination with softening agents.

Nonlimiting examples of quaternaty ammonium type softeners may be selected from the group consisting of: N,N-dimethyl-N,N-di(tallowyloxyethyl) ammonium methylsulfate, N-methyl-N-hydroxyethyl-N,N-di(canoyloxyethyl) ammonium methylsulfate and mixtures thereof.

Additional examples of non-silicone fabric softening agents and deposition aids are described in EP 902 009; WO 99/58492; U.S. Pat. No. 4,137,180; WO 97/08284; WO 00/70004; WO 00/70005; WO 01/46361; WO 01/46363; WO 99/64661; WO 99/64660; JP 11-350349; JP 11-081134; and JP 11-043863. Additional examples of silicone fabric softening agents and deposition aids are described in U.S. Pat. No. 4,448,810; U.S. Pat. No. 4,800,026; U.S. Pat. No. 4,891,166; U.S. Pat. No. 5,593,611; EP 459 821; EP 530 974; WO 92/01773; WO 97/32917; WO 00/71806; WO 00/71807; WO 01/07546; WO 01/23394; JP 2000-64180; JP 2000-144199; JP 2000-178583; and JP 2000-192075.

Finishing Polymers

The finishing polymers can be natural, or synthetic, and can act by forming a film, and/or by providing adhesive properties. For example, the present invention can optionally use film-forming and/or adhesive polymer to impart shape retention to fabric, particularly clothing. By "adhesive" it is meant that when applied as a solution or a dispersion to a fiber surface and dried, the polymer can attach to the surface. The polymer can form a film on the surface, or when residing between two fibers and in contact with the two fibers, it can bond the two fibers together.

Nonlimiting examples of the finishing polymer that are commercially available are: polyvinylpyrrolidone/dimethylaminoethyl methacrylate copolymer, such as Copolymer 958®, molecular weight of about 100,000 and Copolymer 937, molecular weight of about 1,000,000, available from GAF Chemicals Corporation; adipic acid/dimethylaminohydroxypropyl diethylenetriamine copolymer, such as Cartaretin F-4® and F-23, available from Sandoz Chemicals Corporation; methacryloyl ethyl betaine/methacrylates copolymer, such as Diaformer Z-SM®, available from Mitsubishi Chemicals Corporation; polyvinyl alcohol copolymer resin, such as Vinex 2019®, available from Air Products and Chemicals or Moweol®, available from Clariant; adipic acid/epoxypropyl diethylenetriamine copolymer, such as Delsette 101®, available from Hercules Incorporated; polyamine resins, such as Cypro 515®, available from Cytec Industries; polyquaternary amine resins, such as Kymene 557H®, available from Hercules Incorporated; and polyvinylpyrrolidone/acrylic acid, such as Sokalan EG 310®, available from BASF.

Additional examples of suitable finishing polymers include but are not limited to starch carboxymethyl cellulose, hydroxypropyl methyl cellulose, and mixtures thereof.

Other Fabric Treating Agents

Nonlimiting examples of suitable UV protection agents include benzopyrrolidone derivatives (WO 00/65142); sacrificial photofading prevention to retard color fading and/or cinnamate derivatives such as levafix in combination with di-long chain quats (WO 00/00577); aminonapthalene derivatives: fabric substantive sunscreens (WO 99/50379); deposition of UV absorbers via cellulose monoacetate; methoxy cinnamate derivatives (WO 00/18861 and WO 00/18862); esters of PVA and/or SCMC with UV absorbers to enhance active deposition (WO 00/18863); deposition of 2 ethylhexyl 4 methoxy cinnamate in non-ionic/cationic product (WO 97/44422); deposition of UV absorbers of ClogP>4 from rinse products (WO 97/44424); cationic UV absorbers (WO 98/30663); use of hindered amines to retard UV fading of dyed fabrics (WO 01/38470 and WO 01/07550); cationic singlet oxygen quenchers to retard photofading (EP 832 967); NCO containing polymers in combination with water soluble sunscreens (WO 98/49259); antioxidant+tinuvin in rinse conditioner (U.S. Pat. No. 5,962,402); benzotriazole UV absorbers (U.S. Pat. No. 5,733,855).

Nonlimiting examples of suitable dye transfer inhibiting (DTI) agents and/or dye fixing agents include black dye to restore fabric color (WO 99/66019); vinyl-imidazole-acrylic acid copolymers as DTI agents (WO 00/17296); llama UHH antibodies to prevent Red 6 dye transfer (WO 99/46300); acrylic/vinylimidazole copolymers as DTI agents (WO 98/30664); compositions containing selected DTI agents and silica or zeolite as a carrier material; Chromabond+Gasil silica or zeolite; Tinofix; Burcofix; PVP (N-polyvinylpyrrolidone); photoinitiators; hydroxyacetophenone; phosphine oxide derivatives; compositions with reactive polymer (eg amide/epichlorhydrin resin) and reactive anionic polymer and carrier for improved dye fix. (WO 01/25386); PVP/PVI (N-vinylpyrrolidone/N-vinylimidazole copolymer) compositions (U.S. Pat. No. 5,977,046 and WO 97/23591); hyperbranched polymer/dendrimer (EP 875 521); dendritic macromolecule, amine containing (U.S. Pat. No. 5,872,093 and EP 779 358); propylenediamine and piperazine (WO 00/15745) for dye fixing benefits; CMC combinations to reduce fiber mechanical damage and dye loss (WO 00/22079, WO 00/22078, WO 00/22077 and WO 00/22075); dimethyl diallyl based polymers as dye fixing agents (WO 00/56849); polymeric cyclic amines (WO 99/14299); copolymers of epichlorhydrin and cyclic amines together with semi polar nonionics (WO 01/32815 and WO 01/32816); high molecular weight polymers of N-vinylimidazole/N-vinylpyrrolidone as DTI agent (DE 19 621 509); polycationics as dye fixatives (DE 19 643 281); aminosilicones as dye removal protectors and prolonged perfume release (WO 98/39401) and mixtures thereof.

Nonlimiting examples of suitable wrinkle reducing and/or removing agents include use of oxidised polyethylene (DE19 926 863); sulfated castor oil and/or ethoxylated silicones and/or amino PDMS and/or polyacrylamides; Magnasoft® SRS, Silwet® L-7622 (WO 00/24853 and WO 00/24857); ethoxylated PDMS and acrylic polymers (WO 00/27991); emulsion of high viscosity silicone oil and esterquat (WO 00/71806); aliphatic unsaturated hydrocarbons; squalene; paraffin (WO 01/34896); styrene-isoprene or styrene butadiene polymers (WO 01/38627); incorporation of silicone polymers into crosslinked cellulose; silicone carboxylates or silanol containing reacted with acid treated cellulose (WO 01/44426); acrylics with PDMS; arabinogalactans; silicone emulsions; isomaltosuccinamides (WO 00/24851 and WO 00/24856 and WO 00/24858); natural cotyledon extract (WO 01/07554); cellulosic based antiwrinkle technology containing triazine or pyrimidine units and a cross linking agent (WO 01/23660); cationic polyamide/epichlorhydrin resin and silicone lubricant compositions (EP 1 096 056); wrinkle reducing compositions containing silicone and film forming polymer (WO 96/15309); wrinkle reducing compositions containing non-ionic polyhydric alcohol (WO 99/55948 and WO 99/55949); curable aminofunctionalized silicone/fabric softening compositions (U.S. Pat. No. 5,174,912); polyacrylate/dihydroxyethylurea (WO 01/16262) and mixtures thereof. It is understood that some of these wrinkle reducing agents also provide fabric softening benefits.

Nonlimiting examples of fabric rebuild agents and/or fiber repair agents include production of N-alkoxylated chitin/chitosan as reviving agent (DE 10 019 140); cellulose monoacetate as fabric rebuild agent, such as the use of cellulosic polymers as deposition aids for various benefit agents (WO 00/18860, WO 00/18861 and WO 00/18862); cationic polyamine/epichlorhydrin resin crosslinked as fabric rebuild agent; Apomul SAK® (WO 01/25386); polymeric materials capable of self crosslinking or reacting with cellulose; includes reactive polyurethanes (WO 01/27232); compositions containing polyssacharide gum of low molecular weight such as locust bean gum, such gums can be produced in situ via enzyme cleavage, such as Xyloglucans (WO 00/40684 and WO 00/40685); polysaccharide/cellulose ester (acetate); specific substituted rebuild polymers (WO 01/72936 and WO 01/72940 to WO 01/72944); hydrophobized CMC to prevent fibre entanglement (WO 00/42144 and WO 00/47705); high molecular weight PEIs crosslinked with dibasic acids or epichlorhydrin for abrasion resistance (WO 00/49122); propylene diamine polymer derivatives for abrasion resistance (WO 00/49123); lysine caprolactam polymers for abrasion resistance (WO 00/49125); film forming cellulose ethers applied from rinse conditioner (WO 00/65015); lysine/amine or adipic acid copolymers for fiber appearance (WO 99/07813 and WO 99/07814) and mixtures thereof.

Nonlimiting examples of suitable shape retention agents include compositions containing PAE resin (e.g., Apomul SAK) and silicone to provide dimensional stability (WO 00/15747 and WO 00/15748); cationic amine/epichlorhydrin resin (PAE resin) as fabric shape retention agents for dryer applications (WO 00/15755); anionic polymer capable of self cross linking and reacting with cellulose, eg carbamoyl sulfonate terminated blocked isocyanates; provide dimensional stability (WO 01/25387) and mixtures thereof.

Nonlimiting examples of suitable targeting agents are developed in technologies such as attachment of large molecules to cellulose binding polysaccharides (WO 99/36469); attachment of antibodies to functional material and adsorption onto fabric surface (WO 01/46364 and WO 01/48135); proteins having a cellulosic binding domain (CBD) attached to particles via antibody link, enhancement of perfume containing coacervates onto cotton (WO 01/46357); delivery of benefit agent to fabric via peptide or protein deposition aid (WO 98/00500); benefit agent attached to mimic cellulose binding domain (WO 01/34743 and WO 01/32848) and mixtures thereof.

Nonlimiting examples of suitable irritant reducing agents include reduced irritancy of as laundered fabrics via treatment with Lever quaternary ammonium materials (WO 00/17297).

Nonlimiting examples of suitable anti-discoloring agents include phosphonated terminated polyacrylate to provide lower yellowing potential during fabric bleaching (DE 19 904 230).

Nonlimiting examples of suitable hydrophobic finishing agents include polylysine as hydrophobic finishing agent (DE 19 902 506).

Nonlimiting examples of suitable antibacterial agents include combination of amber and musk materials to mask malodor (WO 98/56337); antibacteriocidal compositions containing 5-chlorosalicylanilide (WO 01/60157); antimicrobial compositions containing aminoalkyl silicone, improved surface residuality (WO 96/19194); antimicrobial polypeptides (WO 96/28468); antimicrobial compositions containing aromatic alcohols and phenols (WO 98/01524); antimicrobial activity of alcohols (WO 97/21795); betaine compositions with good antimicrobial activity (WO 97/43368 and WO 97/43369); high pH non-ionic solutions as antimicrobial agents (WO 01/44430); capsule for controlled release of textile treatment agents (DE 19 931 399); composition containing benzylakylammonium, zinc PTO, climbazole (WO 98/01527); alkyldimethylammonium and alcohol ehtoxylates as effective antibacterial compositions (GB 2 322 552); cyclohexyl esters for odor neutralization (WO 01/43784); alkoxy disulphide antimicrobial agents (EP 1 008 296); bromofuranones as antibacterial agents (WO 01/43739) and mixtures thereof.

Brighteners can be organic compounds that absorb the invisible ultraviolet (UV) radiation energy and converts this energy into the longer wavelength radiation energy. The terms "brightener", "optical brightener" and "whitener" are used interchangeably. Nonlimiting examples of brighteners include derivatives of stilbene, pyrazoline, coumarin, carboxylic acid methinecyannines, dibenzothiophene-5,5-dioxide, azoles, 5- and 6-membered ring heterocycles, and the like. Examples of brighteners are disclosed in "The Production and Application of Fluorescent Brightening Agents", M. Zahradnik, published by John Wiley & Sons, New York (1982).

Chemical Modification of the Contaminants

The present invention is directed to processes for enhanced removal of contaminants from a used dry cleaning solvent by modifying the contaminants. More specifically, the original contaminants contains one or more functional moieties that can be modified.

The purification process comprises a first step of providing a mixture of a dry cleaning solvent and at least one contaminant. The mixture may be generated by exposing a fabric article to a dry cleaning solvent or fabric treatment composition comprising fabric treating agents. In specific embodiments, water may be present in the fabric treatment composition or may be applied from a separate source to the fabric article in this fabric article treating step. Then, the used dry cleaning solvent, containing laundry soils and/or fabric treating agents, can be collected and used as the mixture needing purification in the present method. The fabric article treating methods to provide the used solvent or mixture include conventional immersive cleaning methods as well as the non-immersive cleaning methods disclosed in U.S. Patent Publications US 20020133886-A1 and US 20020133885-A1.

The purification process of the present invention include the step of modifying one or more functional moieties of the contaminants (e.g., fabric treating agents or laundry soils) in their original form. The contaminants can be polymeric or non-polymeric materials. When the contaminant is a polymer, the functional moieties can be located in the polymer backbone or at the chain ends. More specifically, in this modification step, the one or more functional moieties undergo chemical changes such that the modified contaminant becomes less soluble in or less compatible with the dry cleaning solvent, thus, it can be separated from the solvent more easily. In one embodiment, the modified contaminant is more hydrophilic than the original contaminant. In another embodiment, the modified contaminant has a lower molecular weight than the original contaminant. In yet another embodiment, the modified contaminant is more polar than the original contaminant. In still another embodiment, the modified contaminant has a higher molecular weight than the original contaminant.

As used herein, the term 'less compatible' or "less soluble" means the difference in Hansen solubility parameters of the dry cleaning solvent and the contaminant becomes larger upon modification of the contaminant. It is known that Hansen solubility parameter is based on the sum of the effects of hydrogen bonding, polarity and dispersion, which are determined by the molecular structure. As a contaminant gets modified by the chemical modifying agents of the present invention, its solubility parameter changes such that the contaminant may separate out of the solvent, as indicated by cloudiness, aggregation, precipitation, and the like.

The purification process of the present invention include the step of modifying the mixture in such a manner that the contaminants are rendered less soluble in the mixture to facilitate the separation of the contaminants and the solvent.

Modification of the mixture can be effected by contacting the mixture with a purification agent, such as an ionic strength modifier, a pH modifier, a flocculating agent, a gelling agent, a biological agent, a liquid extraction agent, and mixtures thereof. As the mixture gets modified by the purification agents of the present invention, the contaminants become less soluble in the modified mixture and the contaminants may begin to separate out of the bulk solvent, as indicated by cloudiness, precipitate forming, and the like.

The separation step of the purification process of the present invention is the separation of the modified contaminants from the dry cleaning solvent. Suitable separation methods are disclosed herein below.

The dry cleaning solvent or composition thus purified can be used as working solvent in subsequent fabric article treatment cycles. In one embodiment of the invention, the purified dry cleaning solvent or composition can be collected and/or reformulated and re-used immediately in several additional fabric treating cycles before they need to go through the purification process again. In another embodiment of the invention, the purified dry cleaning solvent or composition can be removed from the fabric treating system, stored and used later as the working solvent or composition in another system or another fabric treating cycle.

Further, the purification process of the present invention may be applied to the solvent or composition via an in-line (e.g., in the cleaning cycle) component of the cleaning system or as an accessory (e.g., post fabric treating cycle) component of the fabric treating system.

It is recognized that in each purification cycle, a sufficient amount of the contaminants is removed from the dry cleaning solvent or composition such that the level of contaminants in the purified solvent or composition does not impair its performance when it is used as the working solvent or reformulated (by replacing the fabric treating actives that have been removed and/or modified in this purification process to the level in the original composition) as the working composition in subsequent fabric article treating cycles. Where the contaminant is a fabric treatment agent, the removal of fabric treating agents in the purification process can be 100% removal of fabric treating agents, but it does not have to be. Removal of about 50% to about 100% removal of fabric treating agents present in the used solvent or composition can be sufficient. The type of fabric articles and the type of fabric treating agent are factors influencing the level of fabric treating agents that may remain in the purified solvent or composition without impairing its cleaning performance. That is, the purified solvent or composition may comprise a higher level of one type of fabric treating agent than another. For example, the level of dyes may be present from about 0.0001% to about 0.1%, or from about 0.00001% to about 0.1%, or from about 0% to about 0.01% by weight of the working solvent. On the other hand, the level of detersive surfactant in the purified solvent may be from about 0.001% to about 20%, or from about 0.0001% to about 5%, or from about 0% to about 1%.

Chemical Modification of the Contaminants

Reactive chemistry directed to the one or more functional moieties of the contaminants provides several advantages. First, reactive chemistry can be conducted in the non-thermal (i.e., does not involve distillation), low temperature and ambient pressure conditions. Second, reactive chemistry (e.g., oxidation) can be targeted to oxidative sites on the contaminants. Third, by converting the contaminants into less soluble or less compatible species, they may precipitate out of the solvent and thus, can be easily removed by known techniques, such as decantation, centrifugation, and the like.

In situations where the modified contaminants do not readily precipitate out of the solvent, other techniques (such as dialysis) can be applied to facilitate the separation.

In one aspect of the invention, a mixture of a lipophilic fluid and a fabric care agent containing functional moieties selected from the group consisting of acetals, ketals, orthoesters, ethers, amides, imides, and combinations thereof is exposed to an acid such that these functional moieties undergo hydrolysis, thereby transforming the contaminant to a modified form, which can be one or more lower molecular weight species and/or more polar species, compared to the original form of the contaminant. The modified contaminant becomes less compatible with the lipophilic fluid and can be more easily separated from the lipophilic fluid in the separation step.

The transformation of the functional moieties is illustrated schematically below:

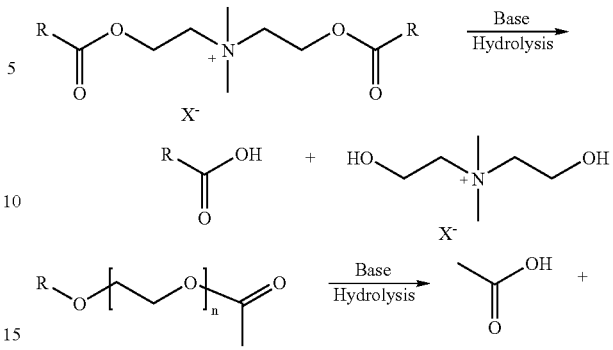

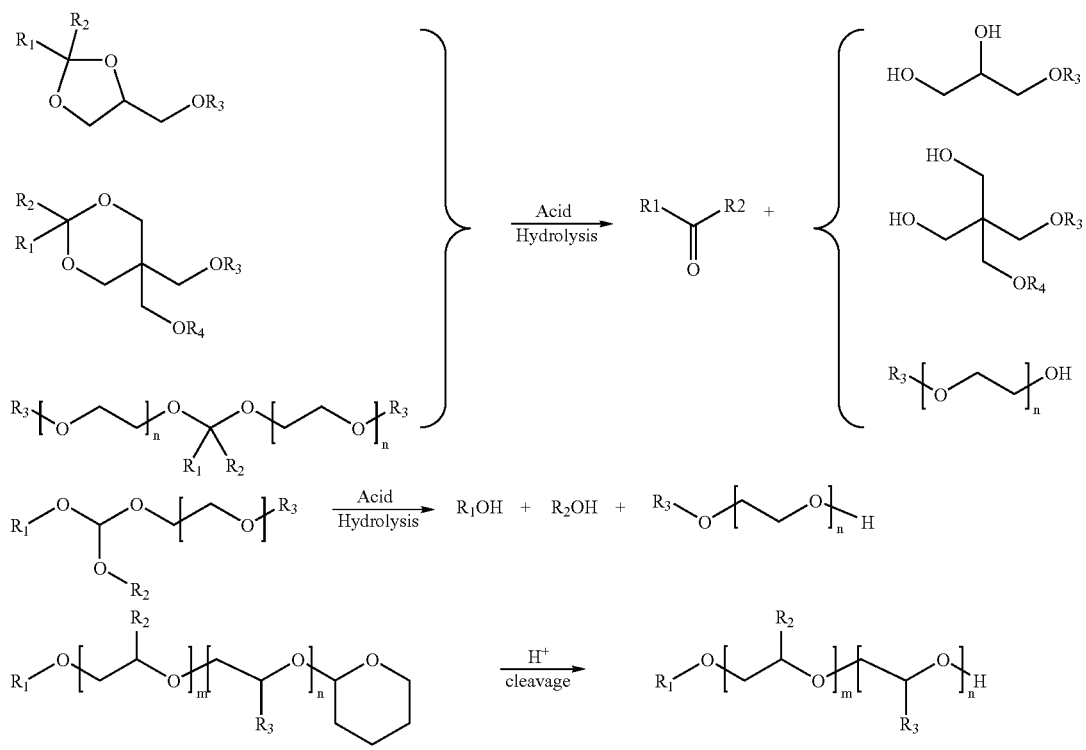

Nonlimiting examples of acids suitable for use herein include Amberlyst-15, acetic acid, oxalic acid, trifluoroacetic acid, formic acid, hydrochloric acid, sulfuric acid, p-toluenesulfonic acid, and various Lewis acids.

In another aspect of the invention, a mixture of a lipophilic fluid and a fabric care agent containing functional moieties selected from the group consisting of esters, carbonates, ester-quaternary nitrogen, and combinations thereof, is exposed to a base or an enzyme such that these functional moieties undergo hydrolysis, thereby transforming the contaminant to a modified form, which can be one or more lower molecular weight species and/or more polar species, compared to the original form of the contaminant. The modified contaminant becomes less compatible with the lipophilic fluid and can be more easily separated from the lipophilic fluid in the separation step. The transformation of the functional moieties is illustrated schematically below:

-continued

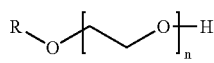

Nonlimiting examples of bases suitable for use herein include bicarbonate and carbonate salts of alkali and alkaline earth metals, hydroxy salts of alkali and alkaline earth metals, alkoxides, guanidine, secondary and tertiary alkyl amines. Enzymes such as lipases and esterases are suitable for use as hydrolyzing agents in the present invention.

In yet another aspect of the invention, a mixture of a lipophilic fluid and a fabric care agent containing functional moieties which are unsaturated C=C bonds (e.g., alkenyls), is exposed to an oxidizing agent such that these functional moieties undergo oxidation, thereby transforming the contaminant to a modified form, which can be one or more lower molecular weight species and/or more polar species, compared to the original form of the contaminant. The modified contaminant becomes less compatible with the lipophilic fluid and can be more easily separated from the lipophilic fluid in the separation step. The oxidative transformations can be either stoichiometric or catalytic and include, but are not limited to, ozonolysis, dihydroxylation, epoxidation, Wacker reaction, and oxidative cleavage. The transformation of the functional moieties is illustrated schematically below:

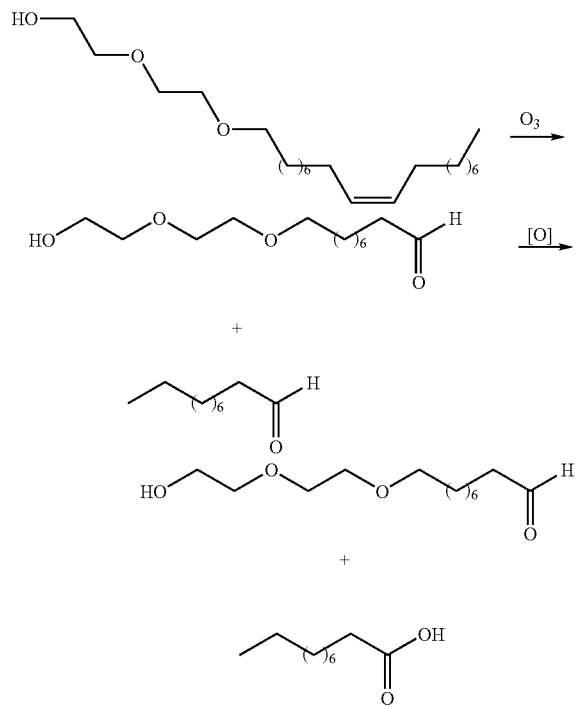

Exemplary oxidizing agents include, but are not limited to, ozone; persulfates; periodates; perchlorates; perborates; peroxydisulfates; peracetic acid; hydrogen peroxide; chlorine dioxide; hypochlorites; permanganates; enzymes; and mixtures thereof. Some of these oxidizing agents may be applied to the contaminated mixtures in their salt form containing a counterion of the alkaline or alkaline earth metals, such as sodium ion, potassium ion, magnesium ions, calcium ions, and the like.

Enzymes suitable for use as the oxidizing agents in the present invention include, but are not limited to, mono-oxygenase and di-oxygenase, alcohol dehydrogenase, alkyl sulfatase, ammonia mono-ogygenase, carbonyl reductase, lipase, lipolase, mono-methanoxigenase, and mixtures thereof.

In still another aspect of the invention, a mixture of a lipophilic fluid and a fabric care agent containing functional moieties which are hydroxyl and aldehyde groups, are exposed to an oxidizing agents such that these functional moieties undergo oxidation, thereby transforming the contaminant to a modified form, which can be one or more lower molecular weight species and/or more polar species, compared to the original form of the contaminant. The modified contaminant becomes less compatible with the lipophilic fluid and can be more easily separated from the lipophilic fluid in the separation step. The transformation of the functional moieties is illustrated schematically below:

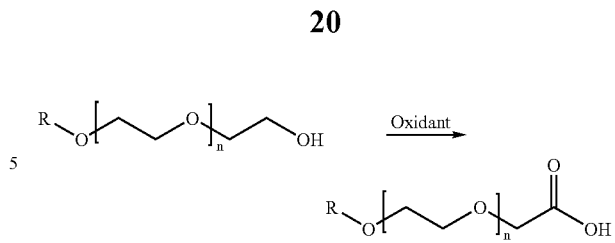

Oxidizing agents suitable for use herein include, but are not limited to, potassium permanganate, ruthenium tetroxide, pyridinium chlorochromate; and the like.

In still another aspect of the invention, a mixture of a lipophilic fluid and a fabric care agent containing functional moieties which are protected hydroxyl groups, are exposed to radiation energy such that these functional moieties undergo homo- and/or heterolytic cleavage, thereby transforming the contaminant to a modified form, which can be one or more lower molecular weight species and/or more polar species, compared to the original form of the contaminant. The modified contaminant becomes less compatible with the lipophilic fluid and can be more easily separated from the lipophilic fluid in the separation step. The transformation of the functional moieties is illustrated schematically below:

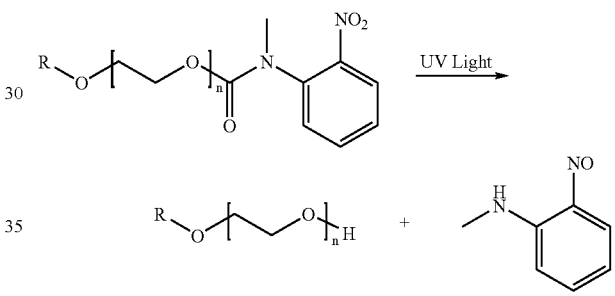

In still another aspect of the invention, a mixture of a lipophilic fluid and a fabric care agent containing functional moieties which are carboxylic acid groups, hydrogen phosphate ester, are exposed to a base such that these functional moieties undergo neutralization, thereby transforming the contaminant to a modified form, which can be one or more lower molecular weight species and/or more polar species, compared to the original form of the contaminant. The modified contaminant becomes less compatible with the lipophilic fluid and can be more easily separated from the lipophilic fluid in the separation step. The transformation of the functional moieties is illustrated schematically below:

Exemplary bases suitable for use herein include, but are not limited to, bicarbonate and carbonate salts of alkali and alkaline earth metals, hydroxy, and alkoxide salts of alkali and alkaline earth metals, tertiary amines and polyamines.

In still another aspect of the invention, a mixture of a lipophilic fluid and a fabric care agent containing functional moieties which are amino groups are exposed to a neutralizing, alkylating agent, such that these functional moieties undergo quaternization reactions, thereby transforming the contaminant to a modified form, which can be one or more lower molecular weight species and/or more polar species, compared to the original form of the contaminant. The modified contaminant becomes less compatible with the lipophilic fluid and can be more easily separated from the lipophilic fluid in the separation step. The transformation of the functional moieties is illustrated schematically below:

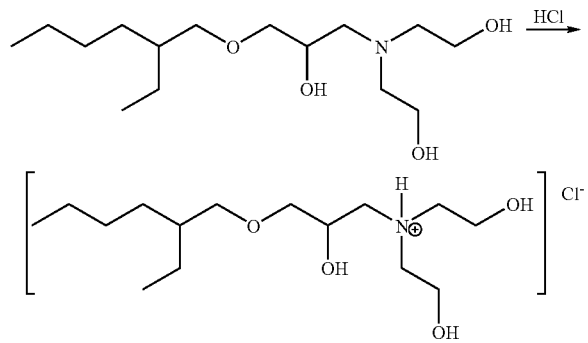

Exemplary neutralizing agents suitable for use herein include, but are not limited to, mineral acids and organic acids. Alkylating agents suitable for use herein include, but are not limited to, alkyl halides, dimethyl or other dialkyl sulfate.

In yet another aspect of the invention, a mixture of a lipophilic fluid and a fabric care agent containing functional moieties such as alkenyls, aromatic, amide, ester, vinyl chloride, epoxy and various silicone bond, such as Si—O—, Si—O—Si, Si-halogen, (as found in the following compounds: siloxanes, silanols, halosilanes, organoalkoxysilanes, organoaminosilanes, hydrosilanes) that undergo polymerization. An example is where a material containing unsaturated carbon bonds is exposed to an initiator (such as a catalyst) and/or energy (such as ultraviolet light, heat, etc.) such that these functional moieties undergo polymerization, thereby transforming the contaminant to a modified form, which can be one or more higher molecular weight species, compared to the original form of the contaminant. The modified contaminant becomes less compatible with the lipophilic fluid and can be more easily separated from the lipophilic fluid in the separation step. The transformation of the functional moieties is illustrated schematically below in the polymerization of ethylene:

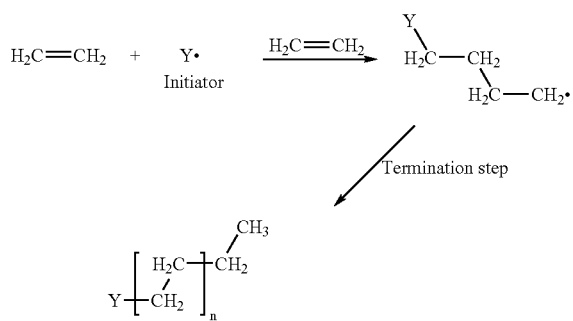

Exemplary catalysts suitable for use herein include, but are not limited to, organic and inorganic transition metal complexes, inorganic and organic radical catalysts, organic and inorganic acids and bases, water, ultraviolet light, heat, and combinations thereof.

In an additional aspect of the invention, biological agents can be added to the mixture of a lipophilic fluid and a fabric care agent such that the contaminant are transformed to a modified form, which can be one or more lower molecular weight species and/or more polar species, compared to the original form of the contaminant. The modified contaminant becomes less compatible with the lipophilic fluid and can be more easily separated from the lipophilic fluid in the separation step.

Biological agents include, but are not limited to, bacteria, yeasts, molds, fungi, protozoa that are commonly used in oil spill clean-up. These biological agents are non-selective and are capable of digesting linkages between C, O, and N atoms.

Modification of the Mixture with Purification Agents

In one aspect of the invention, the purification agents can be ionic strength modifiers, such as the mono-valent alkaline metal cations, or the di-valent alkaline earth metal cations or the di- or multi-valent transitional metal cations. Nonlimiting examples include cations of Na; K; Li; Cs; Zn; Mg; Mn; Ni; Ba; Fe; La; Ce; Zr; Ca; Ce; Al; Cu; Fe; in their cationically charged form, in their magnetizable form; and mixtures thereof.

The purification agents can also comprise unsubstitued or substituted ammonium cations, such as $NH_4^+$ and quaternary ammonium cations. Quaternary ammonium surfactants are described in the art. The properties of these surfactants are very strongly influenced by the type of substituent they contain. Chain length, degree of saturation, branching or the presence and number of hydroxylic or ethoxy groups are some of the factors determining the properties of the surfactant. Whereas typical textile-conditioning actions are performed by cationic surfactants with two long alkyl chains, cationic surfactants with only one long alkyl chain have been reported to improve the detergency performance in laundry detergents. Nonlimiting examples of quaternary ammonium compounds suitable for use herein as the purification agents are disclosed in U.S. Pat. No. 3,123,640 and U.S. Pat. No. 3,141,905, both of which describe cation-active surface-active chemical compounds. The cation-active compounds are quaternary ammonium compounds derived from lower monoalkyl dialkanolamines. The cation-active compounds also include a) dialiphatic, dialkoxylated quaternary ammonium compounds, and b) monoaliphatic, trialkoxylated quaternary ammonium compounds, as described by formulae in the patents, and are useful in the practice of the invention as the polyoxyalkylene ammonium cationic surfactants. Additional exmples include but are not limited to decyltrimethyl ammonium compounds, octyldihydroxyethylmethyl ammonium compounds, and the like.

These cations may be applied to the contaminated solvents or mixtures in their salt form, which contain anionic species of hadiles ($F^-$, $Cl^-$, $Br^-$, $I^-$), hydroxide ($OH^-$), carboxylates ($CO_3^-$), sulfates ($SO_4^-$), sulfites ($SO_3^-$), nitrates ($NO_3^-$), nitrites ($NO_2^-$), phosphates ($PO_4^-$), and mixtures thereof.

The purification agents based on metal cations, $NH_4^+$; quaternary ammonium cations, and mixtures thereof, are typically prepared as a solution in a carrier solvent at a concentration of about 0.1 to about 1 wt % of the carrier solvent. The carrier solvent is a solvent capable of allowing for the cation to dissociate from its salt form. Nonlimiting examples of carrier solvent include water or pH adjusted water. These cationic agents typically interact with the anionic species in the contaminants; the resulting compounds can be easily precipitated out of and separated from the dry cleaning solvent by convention techniques, such as filtration, centrifugation, decantation, and combinations thereof.

By exposing the collected precipitants to a low pH (about 2-4) medium, the precipitants can be dissolved into the cationic agents and the anionic contaminants. The cationic agents can be reclaimed by passing the solution containing the dissolved precipitants through a cation exchange column.

Alternatively, a magnetic field can be applied to draw the precipitants out of the dry cleaning solvent, since some of the metal cations may be in a magnetizable form. Once the precipitants have been removed from the dry cleaning solvent, the magnetic field can be reversed, to release the precipitants into a low pH medium, and the cationic agents can be regenerated and recycled as described above.

The ability to recycled or regenerated the cationic agents provide a great advantage since no additional materials needing disposal is generated by the solvent purification method of the present invention.

In another aspect of the present invention, the purification agents may be pH modifiers selected from mineral acids or organic acids. Mineral acids include, bur are not limited to, HCl, HBr, HI, sulfuric acid, sulfonic acid, nitric acid, phosphoric acid, carboxylic acid. These pH modifiers may have one, two or three dissociable protons. Organic acids refer to the above mineral acids having replaced one or more of the protons with linear, branched or cyclic, saturated or unsaturated alkyl groups.

In still another aspect of the invention, the purification agent may be an aggregation agent such as, water or polymers. For example, water is well-known to induce formation of surfactant aggregates in non-polar solvents that may contain two or more surfactant molecule per aggregate. Thus, the aggregates may become large enough to be separated from the mixture more easily by the separation techniques disclosed herein. The aggregation agents include, but are not limited to, cationic or anionic polymers such as diallyl dimethyl, flocculants such as poly(ethylene oxide), poly(methacrylate) and poly(acrylic acid).

Addition of aggregation agent may be combined with a treatment such as agitation (mixing) and/or sonication to disperse aggregation agent and to provide mechanical energy to induce contaminant molecules to condense into aggregates.

In yet another aspect of the present invention, the purification agent may be a gelling agent such as sorbitol gelators, metal fatty ester soaps, calcium silicates and treated calcium silicates, organic derivatives of castor oil, cellulose derivatives, lecithin, xanthum gum, alginate, and mixtures thereof.

A class of sorbitol derivatives can be used as gelling agents in the present invention. For example, 1,2:2,4-di-O-benzylidene-D-sorbitol (DBS) can form aggregated structures, via hydrogen bonding, in a wide variety of organic solvents, including the lipophilic solvents used herein. Adding the sorbitol gelators to the mixture can result in the formation of aggregates between the sorbitol gelators and contaminants capable of forming hydrogen bonding. The resulting aggregates can be separated from the lipophilic fluids easily.

Metal ester soaps can be used as the gelling agents to further facilitate the separation of the contaminants from the lipophilic fluid. Metal ester soaps comprise a metal ion, such as aluminum, magnesium, zinc, and lithium, and an ester having the general formula: R(CO)O—, wherein the R can be saturated or unsaturated, linear, branched or cyclic C1-C30 alkyl chains. For example, suitable metal fatty esters may comprise metal ions selected from aluminum, magnesium, zinc or lithium, and the fatty acid ester having a chain length of 10 to 28 carbon atoms, or of 12 to 22 carbon atoms, such as stearates, behenates, laurates and palmitates. The aluminum/magnesium hydroxide stearate is commercially available from Giulini Corporation, Bound Brook, N.J., under the general name of Gilugel®.

It is understood that the cations in the metal ester soap can also function as the ionic strength modifiers.

Calcium silicates and treated calcium silicates can also be used as the gelling agent in the present invention. Common forms of calcium silicates include $CaSiO_3$, $CaSiO_4(OH)_2$, $CaSiO_5(OH)_4$. The calcium silicates can be treated with a wide variety of nonpolar organic compounds to render the materials more hydrophobic and less reactive. Useful calcium silicates that are commercially available include the following: Hubersorb® (Huber Corp., Harve de Grace, Md.), and Micro-Cel® (Celite Corp., Denver, Co.). Other silicates such as magnesium silicate, or magnesium/aluminum silicate are also useful herein.

Also suitable for use herein as the gelling agent are various organic derivatives of castor oil, such as Thixcin® R, Thixatrol® ST, and the like. The principal constituent of these castor oil derivative is glyceryl tris-12-hydroxystearate. Various inorganic derivatives of castor oil are also useful herein, such as Thixcin® GR, Thixatrol® GST, Thixseal® 1084, and the like. All these castor oil derivatives or mixtures thereof are available from Rheox, Inc., Hightstown, N.J.

Exemplary cellulose derivatives useful as gelling agents in the present invention include cellulose acetate, cetyl hydroxy ethyl cellulose and other modified celluloses.

Other suitable gelling agents may be derived from natural sources, such as xanthum gum, lecithin, alginate, and the like.

A liquid immiscible with the lipophilic fluid can be used as the liquid extraction agent. A liquid extraction agent, such as an immiscible liquid, can be added to the mixture to provide a second phase, and the contaminant(s) can preferentially migrate from the lipophilic fluid or the mixture to the the second phase or the immiscible liquid. The driving force is based on the partition coefficient of the contaminant(s) in the respective liquids.

Extracting fluids capable of creating a second phase from the lipophilic fluid are suitable for use herein. Nonlimiting examples of liquid extracting agents include, but are not limited to, of water; linear or branched, cyclic, acyclic or aromatic alcohols; linear or branched, cyclic, acyclic or aromatic diols; and mixtures thereof.

Separation Techniques

After the modification, the modified contaminants can be separated from the solvent and/or composition using several well known techniques, such as precipitation; sedimentation; centrifugation; decantation; particulate filtration; membrane filtration; exposure to an absorbent, an adsorbent, a photocatalyst, or mixtures thereof; magnetic separation; temperature modification; liquid-liquid extraction; and combinations thereof.

The modified contaminants that become insoluble in the solvent can be separated from the dry cleaning solvent or composition by density- and/or gravity-based techniques, such as precipitation, sedimentation, decantation, centrifugation.

Precipitation is initiated by a phase separation, which leads to the formation of a solid. Subsequently, gravity separates the solid from the bulk solvent in a 1 to 48 hour time period. Additionally, the formation of a precipitate causes an optical change in the bulk solvent, such that the bulk solvent becomes hazy or cloudy.

Sedimentation is the separation of suspended solid particles from a liquid stream via gravitational settling. Sedimentation can also be used to separate solid particles based on differences in their settling rates.

"Decantation" and "density gradation" are gravity-type separation methods. A "decanter" is defined as a vessel used to separate a stream continuously into two liquid phases using the force of gravity. Using Stokes' law, one can derive the settling velocity of the droplets in the continuous phase and design a decanter accordingly.

Centrifugation is a technique that separates materials based upon differences in density, the rate of separation being amplified by applying increasing rotational force. The force is called a centrifugal force and the apparatus providing the rotational force is called a centrifuge. Centrifugation can be used in combination with precipitation or sedimentation to enhance and accelerate the separation.

When the purification agents contain cationic agents based on the alkaline earth metal cations or transitional metal cations, or in their magnetizable form, magnetization can be used to remove the modified contaminants (i.e., precipitants) from the solvent.

Additionally, temperature modification, such as lowering the temperature of the mixture, can further enhance the separation of the contaminants from the mixture. For example, the compatibility or solubility of the contaminants in the solvent or mixture can be reduced with lowering temperature. In another example, the contaminants may undergo phase change (such as crystallization) and precipitate out of the solvent or mixture.

Particulate filtration can be used for the removal of solid particulates, aggregates, or precipitants from liquids. For example, liquids with low solids content can be filtered such that they become optically clear liquids. The cartridges are typically cylindrical in configuration, though other shapes are also acceptable. The filterer media inside the cartridge can be either pleated or non-pleated, disposable or cleanable/regenerable. The filter media is usually supported by and/or integrally bonded to plastic or metal hardware.

Membrane filtration encompasses the transfer of solute through a membrane or the transfer of solvent through a membrane, as a driving force across the membrane. Dialysis and osmosis are embodiments of membrane filtration techniques. In contrast to particulate filtration, membrane filtration is effective in the removal of low molecular weight solute molecules or ions from a solution by passing them through a membrane driven by a concentration gradient, and optionally, a pressure gradient, across the membrane.

Membranes suitable for use herein may comprise porous inorganic materials, such as alumina, zirconia, titania, silicium carbide, and mixtures thereof. Membranes suitable for use herein may also comprise organic materials such as polytetrafluoroethylene; poly(vinylidene fluoride); polypropylene; polyethylene; cellulose esters; polycarbonate; polysulfone/poly(ether sulfone); polyimide/poly(ether imide); aliphatic polyamide; polyetheretherketone; cross linked polyalkylsiloxane; and mixtures thereof. Suitable membranes are commercially available from GEA Filtration, or GE Osmonics Inc., Minnetoka, Minn.

In one embodiment where low molecular weight solutes are retained on or in the membrane, rather than passing through the membrane; the solutes can be washed out with solvents or water by exchanging salts and other microspecies with the solute molecules. Thus, membrane can be regenerated. Repeated or continuous addition of fresh solvent flushes out the low molecular weight solutes efficiently and rapidly.

Extraction is the selective transfer of a compound or compounds from one liquid to another immiscible liquid or from a solid to a liquid. The former process is called a liquid-liquid extraction, wherein a foreign substance, such as an immiscible liquid, is introduced to provide a second phase, to which the compound(s) can preferentially migrate. The driving force is based on the partition coefficient of the solute compound(s) in the respective liquids. In this separation technique, the compounds in the two liquid phases are merely separated by an interface (i.e., a chemical barrier), not by a physical barrier.

Extracting fluids suitable for use herein to create a second phase from the dry cleaning solvents include, but are not limited to, of water; linear or branched, cyclic or acyclic alcohols; linear or branched, cyclic or acyclic diols; and mixtures thereof.

The modified contaminants can also be removed from the dry cleaning solvent or composition by contacting the mixture with an absorbent material, an adsorbent material, a photocatalyst, or mixtures thereof. These materials can be added to the mixture as solid particulates/powders or can be contained in a cartridge or like container.

Suitable adsorbent materials include, but are not limited to, activated carbon, clay, polar agents, apolar agents, charged agents, zeolites, nanoparticles, and mixtures thereof.

The polar agent suitable for use herein as the adsorbent material has the formula:

$(Y_a—O_b)X$ wherein Y is Si, Al, Ti, P; a is an integer from about 1 to about 5; b is an integer from about 1 to about 10; and X is a metal. In one embodiment, the polar agent suitable for use herein as the adsorbent material is selected from the group consisting of: silica, diatomaceous earth, aluminosilicates, polyamide resin, alumina, zeolites and mixtures thereof. In one embodiment, the polar agent is silica, more specifically silica gel. Suitable polar agents include Silfam® silica gel, available from Nippon Chemical Industries Co., Tokyo, Japan; and Davisil® 646 silica gel, available from W. R. Grace, Columbia, Md.

Apolar agents suitable for use herein as the adsorbent material comprise one or more of the following: polystyrene, polyethylene, and/or divinyl benzene. The apolar agent may be in the form of a fibrous structure, such as a woven or nonwoven web. Suitable apolar agents include Amberlite® XAD-16 and XAD-4, available from Rohm & Haas, Philadelphia, Pa.

The charged agents suitable for use herein are selected from the group consisting of: anionic materials, cationic materials, zwitterionic materials and mixtures thereof. In one embodiment, the charged agent has the formula:

$(W-Z)T$ wherein W is Si, Al, Ti, P, or a polymer backbone; Z is a charged substituent group and T is a counterion selected from alkaline, alkaline earth metals and mixtures thereof. For example, T may be: sodium, potassium, ammonium, alkylammonium derivatives, hydrogen ion; chloride, hydroxide, fluoride, iodide, carboxylate, etc. The W portion typically comprises from about 1% to about 15% by weight of the charged agent. The polymer backbone typically comprises a material selected from the group consisting of: polystryrene, polyethylene, polydivinyl benzene, polyacrylic acid, polyacrylamide, polysaccharide, polyvinyl alcohol, copolymers of these and mixtures thereof. The charged substituent typically comprises sulfonates, phosphates, quaternary ammonium salts and mixtures thereof. The charged substituent may comprise alcohols; diols; salts of carboxylates; salts of primary and secondary amines and mixtures thereof. Suitable charged agents are available from Rohm & Haas, Philadelphi, Pa., under the designation IRC-50.

Suitable absorbent materials include, but are not limited to, hydrogel-forming absorbent materials or absorbent gelling material (AGM), and mixtures thereof.

Hydrogel-forming absorbent polymers are also commonly referred to as "hydrocolloids" and can include polysaccharides, such as carboxymethyl starch, carboxymethyl cellulose, and hydroxypropyl cellulose; nonionic types such as polyvinyl alcohol, and polyvinyl ethers; cationic types such as polyvinyl pyridine, polyvinyl morpholinione, and N,N-dimethylaminoethyl or N,N-diethylaminopropyl acrylates and methacrylates, and the respective quaternary salts thereof. The copolymers thereof may be partially neutralized, slightly network crosslinked, or both. Typically, hydrogel-forming absorbent polymers have a multiplicity of anionic or cationic functional groups. These polymers can be used either alone or in mixtures of two or more different polymers. Examples of these polymer materials are disclosed in U.S. Pat. Nos. 3,661,875; 4,076,663; 4,093,776; 4,666,983, and 4,734,478.

Other hydrogel forming materials are also suitable for use herein as the absorbent materials. Nonlimiting examples of these gels suitable for use herein may be based on acrylamides, acrylates, acrylonitriles, diallylammonium chloride, dialkylammonium chloride, and other monomers. Some suitable gels are disclosed in U.S. Pat. Nos. 4,555,344, 4,828,710, and European Application EP 648,521 A2.

The hydrogel-forming polymer component may also be in the form of a mixed-bed ion-exchange composition comprising a cation-exchange hydrogel-forming absorbent polymer and an anion-exchange hydrogel-forming absorbent polymer. Such mixed-bed ion-exchange compositions are described in, e.g., U.S. patent application Ser. No. 09/130, 321, filed Jan. 7, 1998 by Ashraf, et al. (P&G Case 6976R); and U.S. Pat. No. 6,121,509.

Suitable photocatalysts include, but are not limited to semiconductor photocatalysts, comprising a transition metal atom exchanged into the framework of a zeolite and/or a mesoporous molecular sieve material, which are subsequently loaded with a photoactive material, such as titanium dioxide. Such semiconductor photocatalysts are described in U.S. Pat. No. 6,585,863.

The Cleaning System and Apparatus

The present invention also includes a cleaning system and apparatus suitable for use in the method described above. The cleaning system comprises a fabric article treating vessel, a dry cleaning solvent reservoir, and optionally, a sensor for monitoring the contaminant level in the dry cleaning solvent. When contaminant concentration exceeds some pre-determined value, it would indicate that the dry cleaning solvent has reached maximum contaminant holding tolerance and needs to be purified. Additionally, solvent purification/recovery device comprising a modification unit capable of conducting the purification method of the present invention may also be provided as an integral part of the system/apparatus. However, it needs not be. The solvent purification/recovery unit can be a stand-alone device, separate from the dry cleaning system.

Any suitable fabric article treating vessel known to those of ordinary skill in the art can be used. The fabric article treating vessel receives and retains a fabric article to be treated during the operation of the cleaning system. In other words, the fabric article treating vessel retains the fabric article while the fabric article is being contacted by the dry cleaning solvent. Nonlimiting examples of suitable fabric article treating vessels include commercial cleaning machines, domestic, in-home, washing machines, and clothes drying machines.

The methods and systems of the present invention may be used in a service, such as a cleaning service, diaper service, uniform cleaning service, or commercial business, such as a Laundromat, dry cleaner, linen service which is part of a hotel, restaurant, convention center, airport, cruise ship, port facility, casino, or may be used in the home.

The methods of the present invention may be performed in an apparatus that is a modified existing apparatus and is retrofitted in such a manner as to conduct the method of the present invention in addition to related methods.

The methods of the present invention may also be performed in an apparatus that is specifically built for conducting the present invention and related methods.

Further, the methods of the present invention may be added to another apparatus as part of a dry cleaning solvent processing system. This would include all the associated plumbing, such as connection to a chemical and water supply, and sewerage for waste wash fluids.

The methods of the present invention may also be performed in an apparatus capable of "dual mode" functions. A "dual mode" apparatus is one capable of both washing and drying fabrics within the same vessel (i.e., drum). Dual mode apparatuses for aqueous laundry processes are commercially available, particularly in Europe. Additionally, the method of the present invention may also be performed in an apparatus capable of performing "bi-modal" cleaning functions. A "bi-modal" apparatus is one capable of performing both non-aqueous washing and aqueous washing in the same vessel, wherein the two washing modes can be performed in sequential washing cycles or in a combination washing cycle. Additionally, the bi-modal machine is capable of fully drying the clothes without having to transfer them to a separate machine. That is, a machine can have the bi-modal function as well as the dual-mode function.

An apparatus suitable for use in the present invention will typically contain some type of control systems, including electrical systems, such as "smart control systems", as well as more traditional electro-mechanical systems. The control systems would enable the user to select the size of the fabric load to be cleaned, the type of soiling, the extent of the soiling, the time for the cleaning cycle. Alternatively, the control systems provide for pre-set cleaning and/or refreshing cycles, or for controlling the length of the cycle, based on any number of ascertainable parameters the user programmed into the apparatus. For example, when the collection rate of dry cleaning solvent reaches a steady rate, the apparatus could turn its self off after a fixed period of time, or initiate another cycle for the dry cleaning solvent.

In the case of electrical control systems, one option is to make the control device a so-called "smart device", which provides smart functions, such as self diagnostics; load type and cycle selection; Internet links, which allow the user to start the apparatus remotely, inform the user when the apparatus has cleaned a fabric article, or allow the supplier to remotely diagnose problems if the apparatus malfunctioned. Furthermore, the apparatus of the present invention can also be a part of a cleaning system, the so called "smart system", in which the present apparatus has the capability to communicate with another laundry apparatus that performs a complimentary operation (such as a washing machine or a dryer) to complete the remainder of the cleaning process.

While particular embodiments of the present invention have been illustrated and described, it would be apparent to those skilled in the art that various other changes and modifications can be made without departing from the spirit and scope of the invention. It is therefore intended to cover in the appended claims all such changes and modifications that are within the scope of this invention.

All percentages stated herein are by weight unless otherwise specified. It should be understood that every maximum numerical limitation given throughout this specification will include every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All documents cited are, in relevant part, incorporated herein by reference; the citation of any document is not to be construed as an admission that it is prior art with respect to the present invention.

What is claimed is:

1. A process for purifying a lipophilic fluid, the process comprising the steps of:
   (a) obtaining a mixture comprising a lipophilic fluid and one or more contaminants;
   (b) chemically modifying the contaminant by oxidation;
   (c) contacting the mixture with a purification agent comprising an ionic strength modifier selected from the group consisting of alkali metal cations, alkaline earth metal cations, transition metal cations, ammonium cations and substituted ammonium cations, said ionic strength modifier being in solution in water, thereby changing the solubility of the contaminant in the mixture; and
   (d) separating the contaminant from the lipophilic fluid by precipitation.

2. The process of claim 1 wherein contaminant has a functional moiety selected from the group consisting of acetals, ketals, orthoesters, amides, imides, esters, carbonates, ester-quaternary nitrogen, alkenyls, hydroxyls, aldehydes, protected hydroxyls, carboxylic acids, hydrogen phosphate esters, ethers, amines, Si—O—, Si—O—Si, Si-halogen, and mixtures thereof.

3. The process of claim 1 wherein the chemical modification step (b) is an oxidation reaction selected from the group consisting of ozonolysis dihydroxylation, expoxidation, Walker reaction and oxidative cleavage.

4. The process of claim 1 wherein the contaminant is a polymer having one or more functional moieties located in the polymer chain backbone and/or in the polymer chain end.

5. The process of claim 4 wherein the functional moiety is selected from the group consisting of acetals, ketals, orthoesters, amides, imides, esters, carbonates, ester-quaternary nitrogen, alkenyls, hydroxyls, aldehydes, protected hydroxyls, carboxylic acids, hydrogen phosphate esters, ethers, amines, Si—O—, Si—O—Si, Si-halogen, and mixtures thereof.

6. The process of claim 1 wherein the contaminant is selected from the group consisting of fabric treating agents, laundry soils, and mixtures thereof.

7. The process of claim 6 wherein the contaminant is a fabric treating agent selected from the group consisting of soil release polymers, detersive surfactants, bleaches, enzymes, perfumes, softening agents, finishing polymers, dyes, dye transfer inhibiting agents, dye fixatives, fiber rebuild agents, wrinkle reducing and/or removing agents, fiber repair agents, perfume release and/or delivery agents, shape retention agents, fabric and/or soil targeting agents, antibacterial agents, anti-discoloring agents, hydrophobic finishing agents, UV blockers, brighteners, pigments, pill prevention agents, temperature control agent, skin care lotions, humectants, moisturizers, viscosity modifiers, insect repellents, fire retardants, and mixtures thereof.

8. The process of claim 1 wherein the lipophilic fluid is selected from the group consisting of linear or cyclic siloxanes, glycol ethers, glycerine ethers, hydrocarbons, fluorocarbons, chlorocarbons, and mixtures thereof.

9. The process of claim 1 wherein the lipophilic fluid comprises decamethylcyclopentasiloxane.

* * * * *

UNITED STATES PATENT AND TRADEMARK OFFICE
CERTIFICATE OF CORRECTION

PATENT NO. : 7,300,593 B2 Page 1 of 1
APPLICATION NO. : 10/876177
DATED : November 27, 2007
INVENTOR(S) : Arredondo et al.

It is certified that error appears in the above-identified patent and that said Letters Patent is hereby corrected as shown below:

Column 5
Line 1, delete "Coming" and insert -- Corning --.

Column 7
Line 8, delete "CIO" and insert -- C10 --.

Line 19, delete "I" after the word contain and insert -- 1 --.

Line 33 (formula c), delete "$M_aD_bD'_cT_d(D_eM_a)_{+d}$" and insert -- $M_aD_bD'_cT_d(D_eM_a)_{1+d}$ --.

Line 41, delete "$R^4_2SiO_{1/2}$" and insert -- $R^4_2SiO_{2/2}$ --.

Column 8
Line 49, delete "II" after the phrase wherein $R^5$ of formula, and insert -- III --.

Column 10
Line 15, delete "(III)" and insert -- (II) --.

Column 23
Line 63, delete "R(CO)O-" and insert -- R(CO)O⁻ --.

Signed and Sealed this

Twenty-ninth Day of April, 2008

JON W. DUDAS
*Director of the United States Patent and Trademark Office*